United States Patent
Sugimoto et al.

(10) Patent No.: US 9,438,292 B2
(45) Date of Patent: Sep. 6, 2016

(54) VEHICLE COMMUNICATION APPARATUS

(71) Applicants: DENSO CORPORATION, Kariya, Aichi-pref. (JP); Nippon Soken, Inc., Nishio, Aichi-pref. (JP)

(72) Inventors: Yuji Sugimoto, Kariya (JP); Tadao Suzuki, Kariya (JP); Yasumune Yukizaki, Okazaki (JP)

(73) Assignees: DENSO CORPORATION, Kariya, Aichi-pref. (JP); NIPPON SOKEN, INC., Nishio, Aichi-pref. (JP)

( * ) Notice: Subject to any disclaimer, the term of this patent is extended or adjusted under 35 U.S.C. 154(b) by 210 days.

(21) Appl. No.: 14/462,958

(22) Filed: Aug. 19, 2014

(65) Prior Publication Data

US 2015/0065067 A1  Mar. 5, 2015

(30) Foreign Application Priority Data

Aug. 28, 2013 (JP) ................................. 2013-177177

(51) Int. Cl.
| | | |
|---|---|---|
| *H04B 17/00* | (2015.01) | |
| *H04W 52/24* | (2009.01) | |
| *H04W 24/02* | (2009.01) | |
| *H04B 1/3822* | (2015.01) | |
| *H04B 17/12* | (2015.01) | |
| *H04B 1/04* | (2006.01) | |

(52) U.S. Cl.
CPC ............ *H04B 1/3822* (2013.01); *H04B 17/12* (2015.01); *H04W 24/02* (2013.01); *H04W 52/242* (2013.01); *H04B 2001/0416* (2013.01)

(58) Field of Classification Search
None
See application file for complete search history.

(56) References Cited

U.S. PATENT DOCUMENTS

| | | | | |
|---|---|---|---|---|
| 2002/0060646 | A1* | 5/2002 | Petros | ................. H01Q 1/1285 343/713 |
| 2004/0164913 | A1* | 8/2004 | Ogino | ................. H01Q 1/1271 343/713 |

FOREIGN PATENT DOCUMENTS

| | | |
|---|---|---|
| JP | 2001-332986 | 11/2001 |
| JP | 2010-283420 | 2/2010 |
| JP | 2010-109546 | 5/2010 |

* cited by examiner

*Primary Examiner* — Philip Sobutka
(74) *Attorney, Agent, or Firm* — Harness, Dickey & Pierce, P.L.C.

(57) ABSTRACT

A vehicle communication apparatus includes an antenna module, a wireless communication device placed and physically separated from the antenna module, a first communication cable and a second communication cable. The antenna module includes a first antenna and a second antenna. The wireless communication device includes a first antenna-connecting sending portion, a second antenna-connecting receiving portion, an adjustment portion, a memory, and a loss amount calculation portion calculating a loss amount by the first communication cable. The adjustment portion adjusts the sending power of the sending wave radiated from the first antenna based on the loss amount calculated by the loss amount calculation portion, and equalizes the sending power with a reference power.

9 Claims, 10 Drawing Sheets

VEHICLE FRONT ← → VEHICLE REAR

VEHICLE COMMUNICATION APPARATUS

CROSS REFERENCE TO RELATED APPLICATIONS

This application is based on Japanese Patent Application No. 2013-177177 filed on Aug. 28, 2013, the disclosures of which is incorporated herein by reference.

TECHNICAL FIELD

The present disclosure relates to a vehicle communication apparatus using a wireless communication device connected with an antenna through a coaxial cable.

BACKGROUND

Patent document 1: JP-A-2010-283420

Patent document 1 discloses a wireless communication device performing wireless communication through an antenna. The wireless communication device includes inside a power detection device for detecting an output power of a signal outputted from the wireless communication device, and a power adjustment portion for adjusting the output power. A value of the output power, which has been detected by the power detection device, is outputted to the power adjustment portion. The power adjustment portion adjusts the output power based on the detection result, so that the output power of the signal outputted from the wireless communication device is adjusted to a desired output power value.

Since an antenna is placed separately from a wireless communication device when the wireless communication device mounted to a vehicle, an antenna module including the antenna may be connected with the wireless communication device by a coaxial cable. Hereinafter, the wireless communication device mounted to a vehicle (or used in a vehicle) is referred to as a vehicle communication apparatus.

The applicants of the present invention have found the following with respect to a vehicle communication apparatus.

Even when a vehicle communication apparatus differs individually, the vehicle communication apparatus needs to radiate a sending wave from an antenna with the same output power (corresponding to a reference power). However, when the antenna is placed physically apart from the wireless communication device through the coaxial cable, a sending power of the sending wave radiated from the antenna may be influenced by a loss in the coaxial cable. Since a length of the coaxial cable connecting the antenna and the wireless communication device differs for each vehicle model, an influence of the loss by the coaxial cable with respect to the sending power of the antenna may be differ for each vehicle model. Therefore, so as to eliminate differences of an output power between vehicle models, a set point of the output power of the wireless communication device may be adjusted for each vehicle model.

Even when the wireless communication device of patent document 1 is used as the wireless communication device of the vehicle communication apparatus, the power detection device is included to the wireless communication device, and a loss amount by the coaxial cable connecting the antenna module and the wireless communication device may be undetectable.

It may be considered that the power detection device includes the antenna module, so that the loss amount of the coaxial cable may be considered and the output power may be adjusted. However, a circuit configuration of an antenna module may become complicated and a manufacturing cost may increase with an arrangement of the power detection device.

Since the antenna module requires a packaging area for mounting an antenna and the power detection device, the antenna module may become large and a mountability of the antenna module may be lost.

SUMMARY

The present disclosure relates to a vehicle communication apparatus in which a coaxial cable connects an antenna module and a wireless communication device. A circuit in the vehicle communication apparatus is prevented from being complicated, and a packaging area including the antenna module is prevented from increasing. The vehicle communication apparatus adjusts a sending power of an antenna to a desired reference power.

A vehicle communication apparatus includes an antenna module, a wireless communication device placed physically apart from the antenna module, a first communication cable connecting the antenna module with the wireless communication device, and a second communication cable connecting the antenna module with the wireless communication device. The antenna module includes a first antenna and a second antenna. The wireless communication device includes a first antenna-connecting sending portion connected with the first antenna through the first communication cable and outputting a sending signal radiated from the first antenna as a sending wave, a second antenna-connecting receiving portion connected with the second antenna through the second communication cable and receiving the sending wave radiated from the first antenna with the second antenna as a receiving signal, an adjustment portion adjusting a sending power of the sending wave radiated from the first antenna, a memory storing in advance a coupling amount representing an attenuation degree of an electric wave between the first antenna and the second antenna, and a loss amount calculation portion calculating a loss amount by the first communication cable based on an output power when the first antenna-connecting sending portion outputs the sending signal to the first communication cable, an input power when the receiving signal is inputted to the second antenna-connecting receiving portion, and the coupling amount stored by the memory. The adjustment portion adjusts the sending power of the sending wave radiated from the first antenna based on the loss amount calculated by the loss amount calculation portion, and equalizes the sending power with a reference power.

According to the vehicle communication apparatus in the present disclosure, the loss amount calculation portion calculates the loss amount by the first communication cable based on the output power of the first antenna-connecting sending portion, the input power of the receiving signal inputted to the second antenna-connecting receiving portion, and the coupling amount stored in the memory. The adjustment portion adjusts the sending power of the sending wave radiated from the first antenna based on the loss amount due to the coaxial cable, and equalizes the sending power of the sending wave with the reference power.

According to the vehicle communication apparatus in the present disclosure, the antenna module does not include a power detection device to detect the sending power of the first antenna. The wireless communication device instead of the antenna module includes the memory, the loss amount calculation portion, and the adjustment portion, which are components to equalize the sending power of the sending wave radiated from the first antenna with the reference power.

According to the vehicle communication apparatus in the present disclosure, it is possible that a circuit of the vehicle communication apparatus is prevented from being complicated, and that a packaging area of the antenna module is prevented from increasing. It is possible that the vehicle communication apparatus sets the sending power from the first antenna into the desired reference power irrespective of the vehicle model to which the vehicle communication apparatus is mounted.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
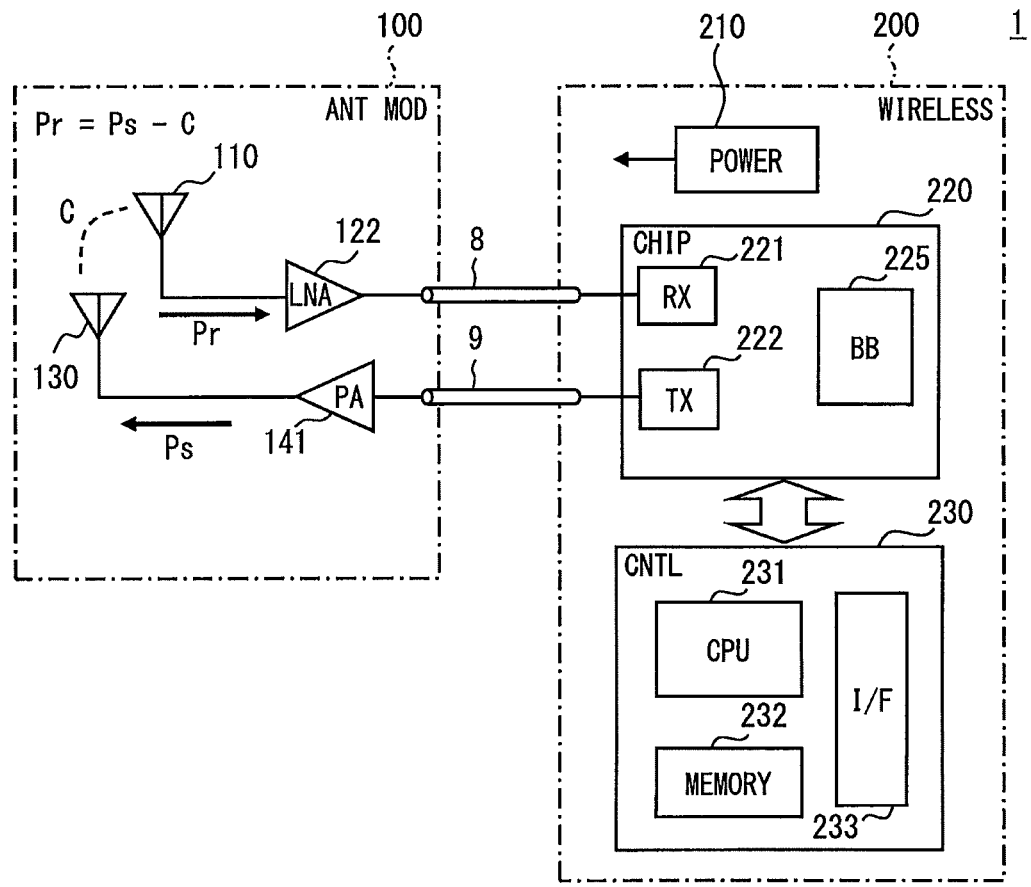
FIG. 1 is a block diagram illustrating an example of a schematic configuration of a vehicle communication apparatus in a first embodiment.

Following, embodiments of the present disclosure will be described based on the drawings. As described in FIG. 1, a vehicle communication apparatus 1 in a first embodiment includes an antenna module 100 and a wireless communication device 200. The vehicle communication apparatus 1 is a wireless communication device performing both or either of an inter-vehicle communication and a roadside-vehicle communication. 700 MHz bands or 5.9 GHz bands of a communication frequency, for example, is used for the inter-vehicle communication and the roadside-vehicle communication.

Figure 5:
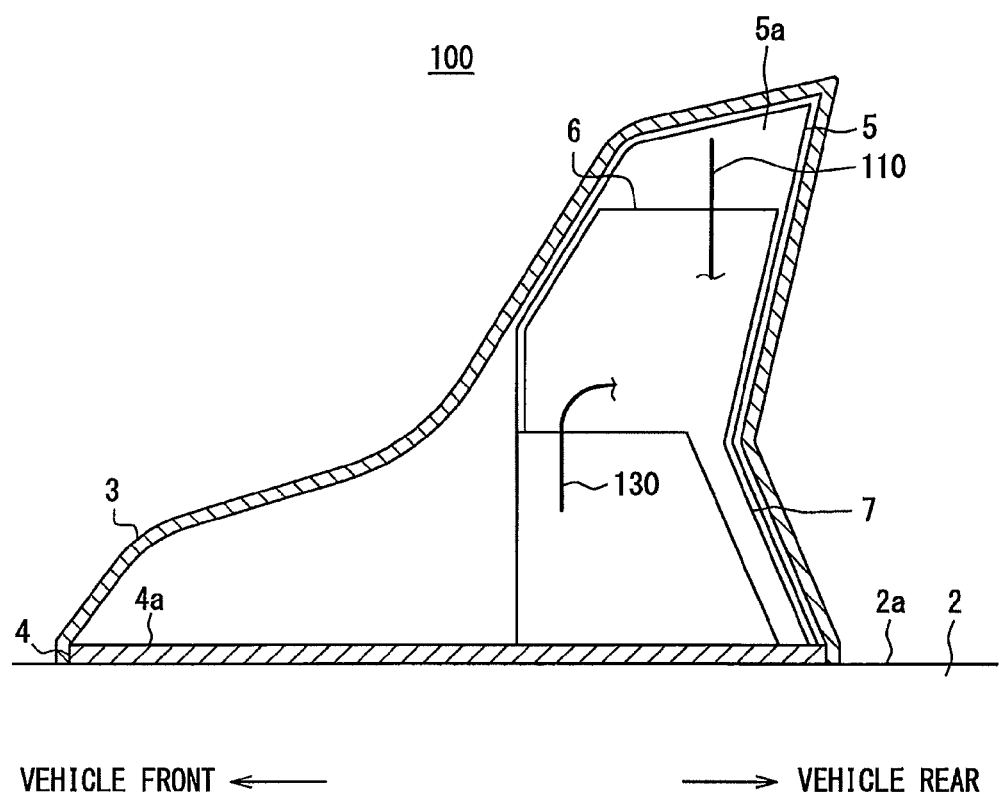
FIG. 5 is a partial sectional view in a state where an antenna module is mounted on a vehicle roof.

An antenna module 100 of the vehicle communication apparatus 1 in the first embodiment is placed above a top face 2a of a vehicle roof 2, as described in FIG. 5. On the contrary, a wireless communication device 200 is placed at a predetermined position inside the vehicle. Therefore, the wireless communication device 200 is placed physically apart from the antenna module 100. The wireless communication device 200 is placed using another housing (not shown) different from the antenna module 100. A position where the wireless communication device 200 is placed is not especially limited as long as the wireless communication device 200 is placed inside the vehicle. However, since the wireless communication device 200 includes electronic parts, the wireless communication device 200 may be placed in a position with as little as possible temperature changes by sunlight or the like. The antenna module 100 and the wireless communication device 200 are connected by two coaxial cables 8, 9.

The coaxial cable 8 corresponds to a second communication cable, and the coaxial cable 9 corresponds to a first communication cable in the present disclosure.

(Configuration of Antenna Module 100)

The antenna module 100 includes two antennas 110, 130, a low noise amplifier 122, and a power amplifier 141 as a configuration used for the inter-vehicle communication and the roadside-vehicle communication. The low noise amplifier 122 and the power amplifier 141 are fixed gain amplifiers. A gain of the low noise amplifier 122 is represented by Gr, and a gain of the power amplifier 141 is represented by Gs. The gain Gs of the power amplifier 141 is set in advance to a gain compensating a loss by the coaxial cable 9, the loss which is assumed in a certain vehicle model. Therefore, when a vehicle model on which a vehicle communication device is mounted differs from an assumed certain vehicle model, the loss by the coaxial cable 9 may not necessarily be compensated by the gain Gs.

The antenna 110 is a receiving antenna. A receiving signal received by the antenna 110 is inputted to the low noise amplifier 122. The antenna 110 corresponds to a second antenna in the present disclosure. The low noise amplifier 122 amplifies the receiving signal, and the amplified receiving signal is inputted to a receiving portion 221 (hereinafter, also referred to as a first receiving portion) through the coaxial cable 8 connecting to the low noise amplifier 122. An input terminal of the power amplifier 141 is connected with the coaxial cable 9, and an output terminal of the power amplifier 141 is connected with the antenna 130. Therefore, a signal inputted to the power amplifier 141 from the coaxial cable 9 is amplified by the power amplifier 141 to be changed into a sending wave (also referred to as a transmission wave) of the above frequency band. The sending wave is transmitted through the antenna 130. The antenna 130 corresponds to a first antenna in the present disclosure.

Incidentally, the wireless communication device 200 supplies the low noise amplifier 122 and the power amplifier 141 with supply voltage for driving through the coaxial cables 8, 9, which are connected with each of the amplifiers. For example, the wireless communication device 200 superimposes the supply voltage for driving on the sending signal transmitted from the antenna 130 and outputs the supply voltage for driving to the coaxial cable 9. The power amplifier 141 separates the supply voltage for driving and the sending signal from the receiving signal using a well-known filter or the like. The power amplifier 141 is driven by the supply voltage obtained by the separation, and amplifies and outputs the sending signal from the antenna 130. The supply voltage for driving is superimposed on the receiving signal in the coaxial cable 8, which connects the low noise amplifier 122 and the wireless communication device 200. For simplification of an explanation, a description with respect to the supply voltage for driving, which is superimposed on the receiving signal and the sending signal, will be omitted.

(Configuration of Wireless Communication Device 200)

The wireless communication device 200 includes a controller 230, a communication chip 220, and a power source 210. The power source 210 supplies power to various components inside the wireless communication device 200, and also supplies power to components of the antenna module 100 through the coaxial cables 8, 9.

Figure 2:
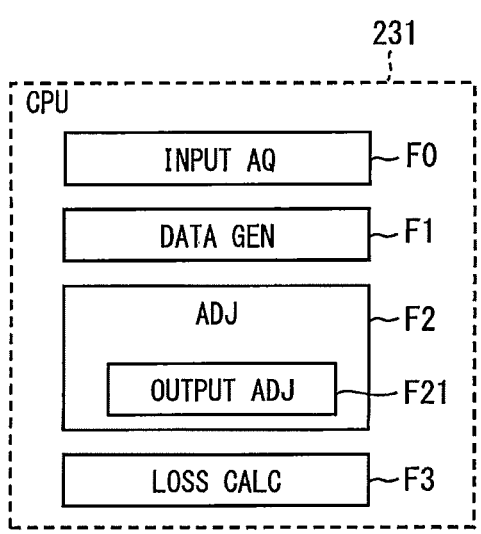
FIG. 2 is a block diagram illustrating a function of CPU in the first embodiment.

The controller 230 includes a CPU 231, a memory 232, and an interface (I/F) 233. The CPU 231 includes an input power acquisition portion F0, a data generation portion F1, an adjustment portion F2, and a loss amount calculation portion F3 as functional blocks, as described in FIG. 2. The input power acquisition portion F0 obtains a value of input power detected by a power detector 221B. The data generation portion F1 generates or obtains a sending data. The adjustment portion F2 includes an output power adjustment part F21 as a fine function. A detail function or the like of the output power adjustment part F21 and the loss amount calculation portion F3 will be described below.

The memory 232 includes a rewritable non-volatile memory at least. The memory 232 may also include a volatile memory. The following, the memory 232 may represent the rewritable non-volatile memory unless otherwise stated. The memory 232 corresponds to a memory in the present disclosure, and stores a coupling amount C. The coupling amount C is measured in advance and corresponds to an attenuation degree (also referred to as an attenuation level) of an electric wave between the antennas 110, 130. A detailed description about the coupling amount C will be described below. The I/F 233 connects various devices and the controller 230, which are mounted in a vehicle, through a not-shown CAN bus.

The communication chip 220 includes the receiving portion 221, a sending portion 222 (hereinafter also referred to as a first sending portion), and a baseband processing portion 225. In the present embodiment, the inter-vehicle communication and a roadside-vehicle communication are performed by a communications standard of IEEE802.11p. The receiving portion 221 corresponds to a second antenna-connecting receiving portion, and the sending portion 222 corresponds to a first antenna-connecting sending portion in the present disclosure.

Figure 3:
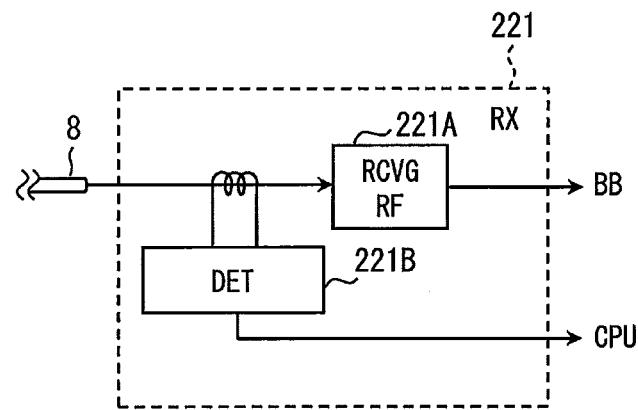
FIG. 3 is a block diagram illustrating an example of a schematic configuration of a receiving portion.

The receiving portion 221 is connected with the coaxial cable 8, and receives a receiving signal, which is received by the antenna 110, through the low noise amplifier 122 and the coaxial cable 8. The receiving portion 221 includes a receiving RF section 221A and a power detector 221B as described in FIG. 3. The receiving portion 221 converts an inputted signal of a high frequency band to a signal of a baseband width by the receiving RF section 221A. The receiving portion 221 performs a wave filtration and amplification, and sends the amplified signal to the baseband processing portion 225. The power detector 221B detects an input power Pin of a signal inputted to the receiving portion 221 through the coaxial cable 8, and outputs the input power Pin to the input power acquisition portion F0 in the CPU 231.

Figure 4:
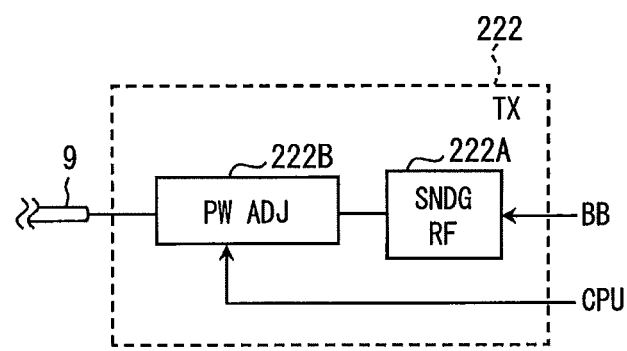
FIG. 4 is a block diagram illustrating an example of a schematic configuration of a sending portion.

As illustrated in FIG. 4, the sending portion 222 includes a sending-side RF section 222A and a power adjustment section 222B. The sending portion 222 converts a signal transmitted from the baseband processing portion 225 into a signal of a high frequency band by the sending-side RF section 222A. The sending portion 222 amplifies the signal to a predetermined output power Pout by the power adjustment section 222B, and outputs to the coaxial cable 9. The power adjustment section 222B amplifies the signal power outputted to the coaxial cable 9 based on instruction from the output power adjustment part F21 of the CPU 231. The power adjustment section 222B may be realized by a well-known attenuator, a variable gain amplifier, or the like.

The baseband processing portion 225 performs a modulation and demodulation of the baseband signal. The sending portion 222 corresponds to a first antenna-connecting sending portion 222, and the receiving portion 221 corresponds to the second antenna-connecting receiving portion.

The communication chip 220 is communicable mutually with the controller 230. The communication chip 220 and the controller 230 communicate mutually when an electric wave is received and also when an electric wave is transmitted.

(Shape and Mounting Position of Antenna Module 100)

As described in FIG. 5, a housing 3 of the antenna module 100 is made from resin, and has a streamlined shape (what is called a shark fin shape) from a vehicle front side toward a vehicle rear side for reasons of a design, or the like.

A ground plate 4 of the antenna module 100 is a metal plate having a plane shape, which is an approximately rectangle. When the antenna module 100 is mounted on a top face 2a of the vehicle roof 2, the ground plate 4 is along the top face 2a. On a ground plate surface 4a, which is an upper surface of the ground plate 4, a printed-circuit board 5 of a plane shape made from resin is mounted approximately vertical with respect to the ground plate surface 4a.

An antenna ground 6 is provided by a conductor pattern (a conductor film) on one surface (also referred to as a first surface) 5a of surfaces of the printed-circuit board 5. In addition, on the first surface 5a, a connection portion 7 is provided by a conductor pattern, which electrically connects the antenna ground 6 and the ground plate 4. The antenna ground 6 has the same potential with the ground plate 4 through the connection portion 7. The antennas 110, 130 are fixed to the printed-circuit board 5. Incidentally, in FIG. 5, circuit configurations of the low noise amplifier 122, the power amplifier 141, or the like, are omitted.

(Measuring Method of Coupling Amount C)

An example of a measuring method of a coupling amount C between the antennas 110, 130 will be explained. A testing model for measuring the coupling amount C has the same configuration in FIG. 1, and the coaxial cables 8, 9 whose loss amount has been separately measured are used. The loss amount by the coaxial cable 8 for a test is represented by La, and the loss amount by the coaxial cable 9 for a test is represented by Lb.

When a sending signal propagates to the coaxial cable 9, the sending signal outputted with the output power Pout from the sending portion 222 is attenuated by Lb and is inputted to the power amplifier 141. The sending signal is amplified by the power amplifier 141 by Gs, and is transmitted from the antenna 130 at the sending power Ps. The sending power Ps is represented by the following expression 1:

$$Ps = Pout - LB + Gs \quad \text{(expression 1)}.$$

When the coupling amount between the antennas 110, 130 is represented by C, the sending wave transmitted from the antenna 130 is attenuated by the coupling amount C and is received by the antenna 110. Therefore, the receiving power Pr of the electric wave received by the antenna 110 corresponds to the following expression:

$$Pr = Ps - C.$$

A receiving signal received by the antenna 110 is amplified by the low noise amplifier 122 by Gr, and is inputted to the receiving portion 221 with attenuation by La through the coaxial cable 8. When an input power of the receiving signal inputted to the receiving portion 221 is represented by Pin, Pin is represented by the following expression:

$$Pin=(Ps-C)+Gr-La=(Pout-Lb+Gs)-C+Gr-La=Pout+Gs+G-La-Lb-C \quad \text{(expression 2)}.$$

The expression 2 may be changed to the following expression 3:

$$C=Pout-Pin+Gs+Gr-La-Lb \quad \text{(expression 3)}.$$

When the output power Pout and the input power Pin are measured and Gs, Gr, La, and Lb, which are known values, are substituted into the expression 3, it is possible that the coupling amount C between the antennas 110, 130 is calculated. Incidentally, when a configuration (a distance between antennas, a length, and a mounting direction) of the antennas 110, 130 is equal in the antennas 110, 130, that is, when the antenna module 100 of the same model is used, it is possible to consider that the coupling amount C is constant.

(Setting Method of Output Power Pout)

The sending power of the sending wave transmitted from the antenna 130 is required to be set up to an output power (hereinafter, referred to as a reference power Pref) regulated by laws and regulations or the like.

A fixing position of the antenna module 100 and a fixing position of the wireless communication device 200 are different in each vehicle model. The lengths of the coaxial cables 8, 9 connecting the antenna module 100 and the wireless communication device 200 are different in each vehicle model. The loss amount by the coaxial cables 8, 9 may be dependent on the length of a coaxial cable, and the loss amount by the coaxial cables 8, 9 differs in each vehicle model.

Conventionally, for each vehicle model or each vehicle, an output power adjustment is performed in an adjustment processing before shipment in advance, and an adjustment value is stored in the memory 232 so that the sending power of the sending wave transmitted from the antenna 130 may become the reference power Pref. The adjustment value is set up in consideration of the loss amount by the coaxial cable 9 and the gain Gs by the power amplifier 141. However, manufacturing multiple kinds of the wireless sending devices corresponding to multiple kinds of vehicle models or performing an output power adjustment for each vehicle model may make a cost reduction by mass production difficult.

On the contrary, the vehicle communication apparatus 1 in the present embodiment has two antennas 110, 130, which are closely placed each other and are placed within the housing 3 made from resin to be separated from the external portion. Therefore, the coupling amount C is stable. By executing an output power adjustment processing explained below, it is possible to remove an adjusting processing for each vehicle model, and to control an error between the sending power from the antenna 130 and the reference power Pref. Incidentally, since the gain Gs of the power amplifier 141 is a fixed value, when the same combination of the antenna module 100 and the wireless communication device 200 is used, it is possible to use the same value irrespective of a vehicle model. With respect to the gain Gr of the low noise amplifier 122, when the same combination of the antenna module 100 and the wireless communication device 200 is used, it is possible to use the same value irrespective of a vehicle model. The fixed values may be stored in the memory 232. In the present embodiment, the reference power Pref may be 20 dBm as an example.

(Output Power Adjustment Processing)

Figure 6:
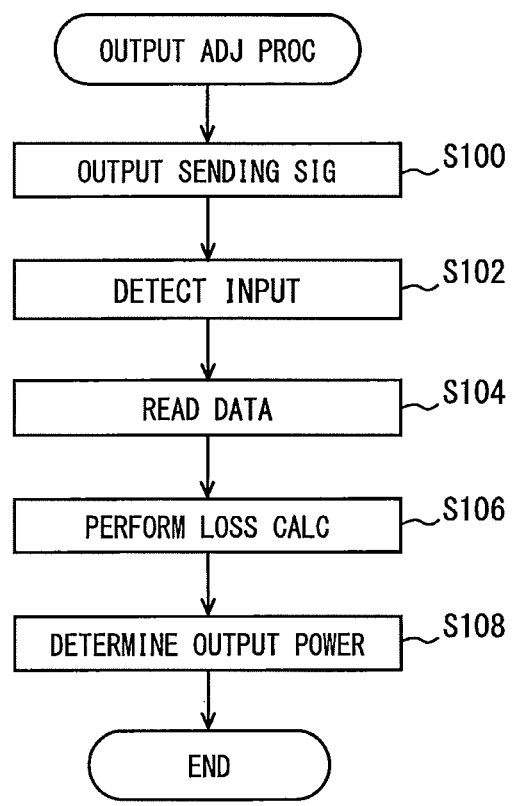
FIG. 6 is a flowchart illustrating an output power adjustment processing performed by the CPU.

A processing (hereinafter, referred to as an output power adjustment processing) for adjusting the output power Pout of the sending signal in the controller 230 will be explained with referring a flowchart of FIG. 6. The flowchart in FIG. 6 may start when the wireless communication device 200 starts, for example. In addition or alternatively, the flowchart of FIG. 6 may be appropriately (e.g. at a fixed cycle) executed at a timing without interrupting communication after the wireless communication device 200 is started up.

At step S100, the controller 230 causes the sending portion 222 to output the sending signal at a predetermined output power Pout through the coaxial cable 9. The processing moves to step S102. The output power Pout may be a default value, which is set in advance, when the output power adjustment processing is performed for the first time after the wireless communication device 200 is started up. The default value may be the sending power Ps when an signal amplified by the power amplification 141 is radiated from the antenna 130 and corresponds to the reference power Pref (corresponding to 20 dBm) without considering the loss amount by the coaxial cable 8, for example. In an example of the present embodiment, the gain Gs of the power amplifier 141 may be 2 dB, and the output power Pout may be equal to 18 dBm. Incidentally, when the output power adjustment processing is repeatedly performed after the wireless communication device 200 is started up, the output power Pout corresponds to a set value of the output power at present.

A sending signal outputted from the sending portion 222 is radiated from the antenna 130 through the coaxial cable 8 and the power amplifier 141. As described above, since the lengths of the coaxial cables 8, 9 are unknown, the loss amount of the coaxial cables 8, 9 are also unknown. However, since the antennas 110, 130 are placed into the same housing 3, it is supposed that the lengths of the coaxial cables 8, 9 are identical. In addition, since it is supposed that a performance of the coaxial cables 8, 9 per unit length is similar to each other, the loss amount by the coaxial cables 8, 9 is equal to each other and defined as L.

Incidentally, the antenna 110 receives electric waves from other devices performing the inter-vehicle communication and the roadside-vehicle communication. Therefore, it may be preferred that the sending signal outputted from the sending portion 222 during the output power adjustment processing is distinguished from signals transmitted by other devices. For example, it is supposed that a subject wireless communication device 200 transmits the sending signal, and the receiving portion 221 of the subject wireless communication device 200 receives the sending signal. In this case, an input power Pin to the receiving portion 221 of the sending signal from the subject wireless communication device 200 becomes much larger than another input power to the receiving portion 221 corresponding to a sending signal transmitted from a device other than the subject wireless communication device 200. The sending signal transmitted from the device other than the subject wireless communication device 200 propagates much longer distance (e.g. 100 meters) than the sending signal transmitted from the subject wireless communication device 200. Therefore, when the input power Pin is larger than a predetermined threshold value Pth1, the CPU 231 determines that the receiving signal is the sending signal outputted from the sending portion 222 of the subject wireless communication device 200. The threshold value Pth1 may be a value measured by a test or the like, and the threshold value Pth1 may be any value as long as a case where the sending signal transmitted by the wireless communication device 200 is inputted to the receiving portion 221 as a receiving signal is distinguished from another case where the sending signal transmitted from another device is inputted to the receiving portion 221 as the receiving signal. The threshold value Pth1 may be stored in the memory 232. Alternatively, a sending time when the sending portion 222 outputs the sending signal, and a receiving time when the receiving portion 221 receives the receiving signal are stored. When the sending time and the receiving time satisfy a predetermined connection (for example, the receiving portion 221 receives the receiving signal within a fixed period of time after the sending time), it may be determined that the receiving signal corresponds to a sending signal transmitted from the sending portion 222 of the subject wireless communication device 200.

At step S102, the receiving portion 221 receives the sending signal outputted from the sending portion 222. In more detail, the sending wave radiated from the antenna 130 at step S100 is received by the antenna 110. The receiving signal received by the antenna 110 is inputted to the receiving portion 221 through the low noise amplifier 122 and the coaxial cable 8. The power detector 221B measures a magnitude of the input power Pin of the receiving signal, and outputs a measured value to the CPU 231. The processing moves to step S104.

At step S104, the controller 230 accesses the memory 232, and reads out the coupling amount C, the gain Gs of the power amplifier 141, and the gain Gr of the low noise amplifier 122, which are stored in the memory 232. The processing moves to step S106.

At step S106, the loss amount calculation portion F3 performs a loss amount calculation processing, and moves to step S108. In the loss amount calculation processing at step S106, the loss amount L of the coaxial cable 9 is calculated. Followingly, a processing calculating the loss amount L will be described.

The input power Pin of a receiving signal received by the receiving portion 221 will be expressed by the following expression 4. To generate the expression 4, L in the expression 3 is substituted to La and Lb, and arranged.

$Pin=Pout+Gs+Gr-C-2L$     (expression 4).

The loss amount L is calculated as described in the following expression 5 by transforming the expression 4.

$L=(Pout-Pin+Gs+Gr-C)/2$     (expression 5).

Since the input power Pin, the output power Pout, the gains Gs, Gr of each amplifier, and the coupling amount C are measurable or known values, the loss amount L will be calculated by substituting the values to the expression 5.

At step S108, by referring with the loss amount L calculated at step S106, the output power adjustment part F21 adjusts the output power of the sending portion 222, and ends the output power adjustment processing. More specifically, the output power adjustment part F21 changes the set point of the output power Pout of the power adjustment section 222B, which the sending portion 222 has, as described by the following expression:

$Pout=Pref-Gs+L$.

According to the configuration of the first embodiment, the loss amount L in the coaxial cables 8, 9 is calculated from the output power Pout of the sending portion 222, the input power Pin detected in the receiving portion 221, and the fixed values C, Gs, and Gr stored in the memory 232. The output power adjustment part F21 adjusts the output power Pout in consideration of the loss amount L in the coaxial cable 9.

Accordingly, the vehicle communication apparatus 1 outputs the sending signal having the output power Pout in consideration of loss amount L in the coaxial cable 9 from the sending portion 222. Therefore, it is possible to set the sending power Ps from the antenna 130 to the reference power Pref of the desired value irrespective of a vehicle model including the vehicle communication apparatus 1.

In the above configuration, the antenna module does not include a power detection device for detecting the sending power Ps of the antenna 130. Furthermore, the wireless communication device 200 instead of the antenna module 100 includes the memory 232, the loss amount calculation portions F3, and the adjustment portion F2, which are components for causing the sending power Ps of the sending wave radiated from the antenna 130 to be equal with the reference power Pref. Therefore, it is possible that a circuit provided into the antenna module 100 is prevented from being complicated, and that a packaging area of the antenna module 100 is prevented from increasing. It is possible that the vehicle communication apparatus sets the sending power from the antenna 130 into the desired value irrespective of the vehicle model to which the vehicle communication apparatus 1 is mounted.

(First Modification)

Figure 7:
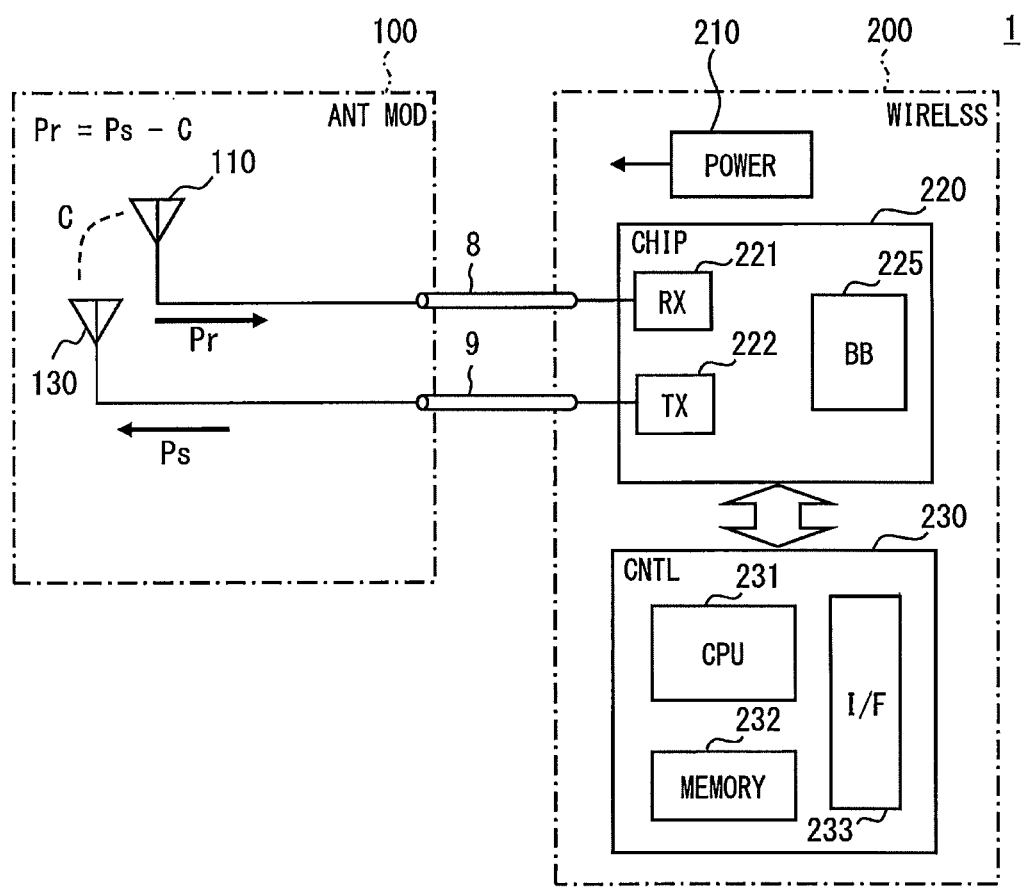
FIG. 7 is a block diagram illustrating an example of a schematic configuration of the vehicle communication apparatus in the first modification.

Incidentally, in the above first embodiment, the antenna 110 and the coaxial cable 8 are connected with the low noise amplifier 122. However, a configuration may not be limited to this configuration. As described in FIG. 7, the antenna 110 and the coaxial cable 8 may be connected with each other directly. In this case, the gain Gr of the low noise amplifier 122 may correspond to 0 dB.

In the first embodiment, the antenna 130 and the coaxial cable 9 are connected with the power amplifier 141. Similarly, the antenna 130 and the coaxial cable 9 may be connected directly. In this case, the gain Gs of the power amplifier 141 may correspond to 0 dB. According to the first modification, it is possible that the loss amount L by the coaxial cables 8, 9 is calculated from the output power Pout, the input power Pin, and the coupling amount C.

Second Embodiment

Although the first embodiment is explained, the present disclosure is not limited to a description of the first embodiment, and a following second embodiment, for example, will be included in a scope of the present disclosure. Followingly, the second embodiment will be explained with referring to the drawings. Incidentally, for simplifying the explanation, a component having the identical function with a component in the drawings explained in the first embodiment will be represented by the same symbol, and the explanation will be omitted. In addition, when a configuration is explained partially in the following embodiment, the explanation in the first embodiment will be applied to another part of the configuration.

Figure 8:
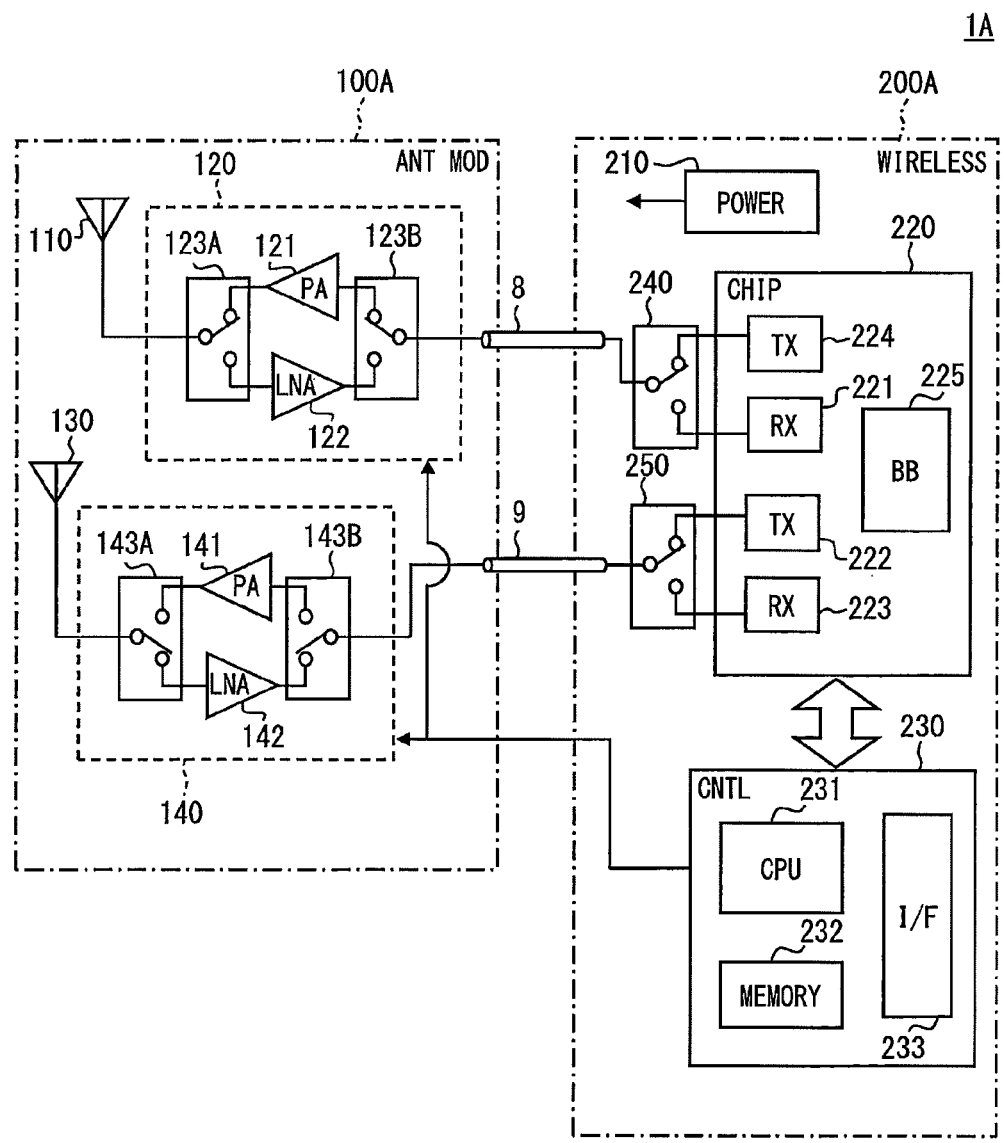
FIG. 8 is a block diagram illustrating an example of a schematic configuration of the vehicle communication apparatus in a second embodiment.

A vehicle communication apparatus 1A in the second embodiment includes an antenna module 100A and a wireless communication device 200A as described in FIG. 8. The antenna module 100A and the wireless communication device 200A are respectively placed to the same positions as the antenna module 100 and the wireless communication device 200 in the first embodiment.

(Configuration of Antenna Module 100A)

The antenna module 100A includes an antenna 110, an antenna 130, a bidirectional amplifier (BDA) 120, and a BDA 140 as a configuration for an inter-vehicle communication and a roadside-vehicle communication. The BDA 120 corresponds to a second antenna-side bidirectional amplifier, and the BDA 140 corresponds to a first antenna-side bidirectional amplifier.

The BDA 120 includes two changeover switches 123A, 123B, a power amplifier 121, and a low noise amplifier 122. The low noise amplifier 122 and the power amplifier 121 are amplifiers, in which the gains are adjustable (i.e. variable gain amplifier). A gain of the low noise amplifier 122 is represented by Gr1, and a gain of the power amplifier 121 is represented by Gs2. The low noise amplifier 122 corresponds to a second antenna-side receiving amplifier in the present disclosure.

Connection states of the changeover switches 123A, 123B may be changed by various means. In the present embodiment, the changeover switches 123A, 123B are changed based on an instruction signal by a switch controller F4. As another configuration, the BDA 120 may include a signal determination portion (not shown) for determining whether a sending signal is transmitted from the coaxial cable 8, and may change the connection states based on a determination result of the signal determination portion. In this case, when the changeover switches 123A, 123B receive the sending signal from the coaxial cable 8, the changeover switches 123A, 123B are connected with the power amplifier 121. When the changeover switches 123A, 123B do not receive the sending signal from the coaxial cable 8, the changeover switches 123A, 123B are connected with the low noise amplifier 122. Incidentally, a preamble may be attached to the sending signal, the signal determination portion may determine that the sending signal is inputted when the preamble of the sending signal is detected.

The antenna 110 is connected with the coaxial cable 8 through the BDA 120. The antenna 110 is used as both of the receiving antenna and the sending antenna according to the connection states of the changeover switches 123A, 123B in the BDA 120. More specifically, when the changeover switches 123A, 123B are set to a side of the low noise amplifier 122, the antenna 110 is connected to the wireless communication device 200A through the low noise amplifier 122 and the coaxial cable 8. When the changeover switches 123A, 123B are set to a side of the power amplifier 121, the antenna 110 is connected to the wireless communication device 200A through the power amplifier 121 and the coaxial cable 8.

The BDA 140 as well as the BDA 120 includes two changeover switches 143A, 143B, a power amplifier 141, and a low noise amplifier 142. The low noise amplifier 142 and the power amplifier 141 are variable gain amplifiers. A gain of the low noise amplifier 142 is represented by Gr2, and a gain of the power amplifier 141 is represented by Gs1. A connected state of changeover switches 143A, 143B is changed by the same means as the above described changeover switches 123A, 123B. The power amplifier 141 corresponds to a first antenna-side sending amplifier.

The antenna 130 is connected with the coaxial cable 9 through the BDA 140. The antenna 130 is used as the receiving antenna and the sending antenna according to the connection states of the changeover switches 143A, 143B.

(Configuration of Wireless Communication Device 200A)

Figure 9:
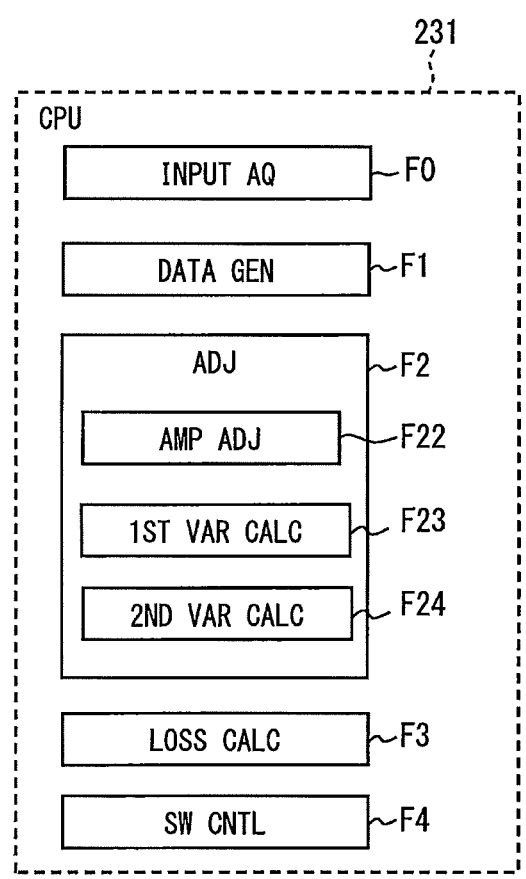
FIG. 9 is a block diagram illustrating a function of the CPU in the second embodiment.

The wireless communication device 200A includes a power source 210, a communication chip 220, a controller 230, and two changeover switches 240, 250. A CPU 231 in the controller 230 includes an input power acquisition portion F0, a data generation portion F1, an adjustment portion F2, a loss amount calculation portion F3, and a switch controller F4 as functional blocks, as described in FIG. 9. The switch controller F4 outputs the instruction signal, which changes a connection state to the changeover switches 240, 250, based on a communicating state of the communication chip 220.

The adjustment portion F2 includes an amplifier adjustment part F22, a first variation amount calculation part F23, and a second variation amount calculation, part F24 as a function in detail. The amplifier adjustment part F22 adjusts a gain of each of the amplifiers 121,122,141,142 according to a loss amount calculated by the loss amount calculation portion F3. The amplifier adjustment part F22, the first variation amount calculation part F23, and the second variation amount calculation part F24 will be explained below. The amplifier adjustment part F22 corresponds to a gain adjustment part in the present disclosure.

Incidentally, the controller 230 is provided with the amplifier adjustment part F22, and the BDAs 120, 140 are communicably connected, and based on a control signal outputted from the amplifier adjustment part F22, the gain of each of the amplifiers 121, 122, 141, 142 is adjusted. A control method of each of the amplifiers may be designed appropriately, and may be implemented by a well-known technology such as a digital control by a parallel or serial interface, an analog control, or the like.

The communication chip 220 includes a first receiving portion 221, a second sending portion 224, a second receiving portion 223, a first sending portion 222, and a baseband processing portion 225. The first receiving portion 221 and the second receiving portion 223 have the same function with the receiving portion 221 described in the first embodiment. The first receiving portion 221 is connected with the changeover switch 240, and the second receiving portion 223 is connected with the changeover switch 250. The second receiving portion 223 corresponds to a first antenna-connecting receiving portion, and the second sending portion 224 corresponds to a second antenna-connecting sending portion in the present disclosure.

The first sending portion 222 and the second sending portion 224 have the same function with the sending portion 222 described in the first embodiment. However, an output signal of each of the sending portions 222, 224 is outputted with fixed output voltages set up based on instructions of CPU 231. The second sending portion 224 is connected with the changeover switch 240, and the sending portion 222 is connected with the changeover switch 250.

The changeover switch 240 changes connection states between one state where the first receiving portion 221 is connected with the coaxial cable 8 and another state where the second sending portion 224 is connected with the coaxial cable 8. The changeover switch 250 changes connection states between one state where the second receiving portion 223 is connected with the coaxial cable 9 and another state where the first sending portion 222 is connected with the coaxial cable 9. The switch controller F4 changes the connection state of the changeover switches 240, 250.

The baseband processing portion 225 performs a modulation and a demodulation of the baseband signal. When the antennas 110, 130 are used as a receiving antenna, a reception diversity (corresponding to a maximum ratio synthetic diversity) is performed. Incidentally, when a signal is transmitted, a transmission diversity may be performed.

The memory 232 stores values of the coupling amount C, and the gains G2, Gr1, Gs1, Gr2 of the amplifiers 121, 122, 141, 142. Hereinafter, the gains Gs2, Gr1, Gs1, Gr2 correspond to present set values of each of the amplifiers 121, 122, 141, 142. When the vehicle communication apparatus 1A is started up for the first time, the gains Gs2, Gr1, Gs1, Gr2 correspond to predetermined default values. The predetermined default values may correspond to appropriately set values, including 0 dB. When the default values of the gain Gs2 of the power amplifier 121 and the gain Gs1 of the power amplifier 141 are too large, the sending power Ps of the sending wave from the antennas 110, 130 may over the reference power Pref. Therefore, the default values of the gain Gs2 of the power amplifier 121 and the gain Gs1 of the power amplifier 141 may be preferred to be several dB. The default value may be determined according to an output power Pout1 from the first sending portion 222 and an output power Pout2 from the second sending portion 224.

(Amplifier Gain Adjustment Processing)

Figure 10:
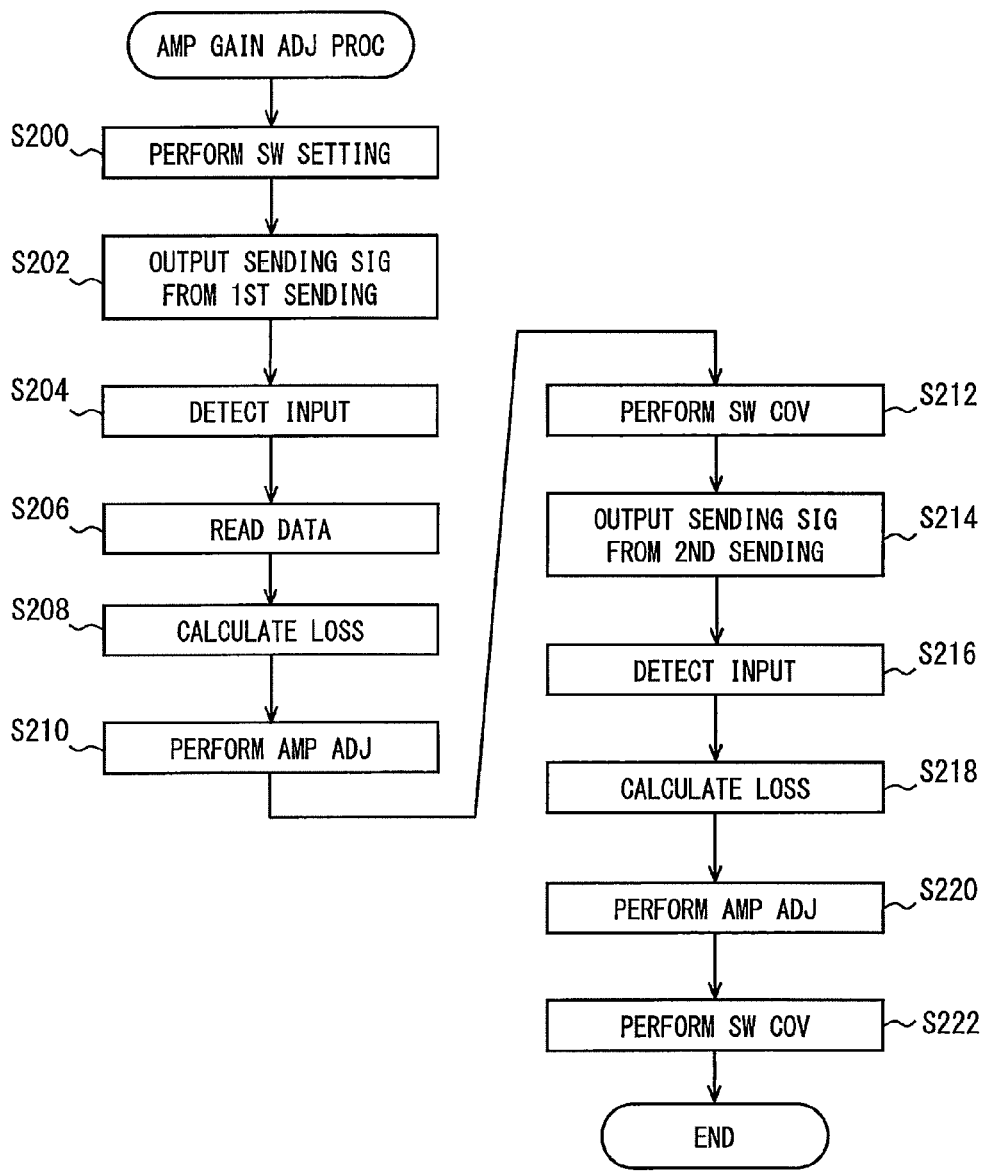
FIG. 10 is a flowchart illustrating an amplifier gain control processing performed by the CPU.

A processing (that is, an amplifier gain adjustment processing) adjusting the gain of each amplifier in the CPU 231 will be explained with referring a flowchart of FIG. 10. The flowchart in FIG. 10 may start when the wireless communication device 200A starts, for example. The flowchart of FIG. 10 may be appropriately (e.g. at a fixed cycle) executed at a timing without interrupting communication after the wireless communication device 200A starts up. Incidentally, the loss amount of the coaxial cable 8 is equal to the loss amount of the coaxial cable 9, and the loss amount is represented by L.

At step S200, a switch setting processing is performed, so that the antenna 110 is set as a receiving antenna and the antenna 130 is set as a sending antenna. The processing moves to step S202. More specifically, the changeover switches 123A, 123B are set up so that the antenna 110 is connected with the coaxial cable 8 through the low noise amplifier 122. In addition, the changeover switch 240 connects the first receiving portion 221 with the coaxial cable 8. Accordingly, the antenna 110 is connected with the first receiving portion 221 through the low noise amplifier 122 and the coaxial cable 8.

The changeover switches 143A, 143B are set up so that the antenna 130 is connected with the coaxial cable 9 through the power amplifier 141. In addition, the changeover switch 250 connects the first sending portion 222 with the coaxial cable 9. Accordingly, the antenna 130 is connected with the first sending portion 222 through the power amplifier 141 and the coaxial cable 9.

At step S202, the controller 230 causes the first sending portion 222 to output the sending signal to the coaxial cable 9 at the desired output power Pout1, and the processing moves to step S204. The output power Pout1 corresponds to a predetermined value or a present output value as similar to the first embodiment; The sending signal outputted from the first sending portion 222 is radiated from the antenna 130 through the coaxial cable 9 and the power amplifier 141. The sending power Ps1 radiated from the antenna 130 is represented by the following expression:

$$Ps1 = Pout1 - L + Gs1.$$

At step S204, the first receiving portion 221 receives the signal outputted from the first sending portion 222. In more detail, the sending wave radiated from the antenna 130 at step S202 is received by the antenna 110. The first receiving portion 221 receives the receiving signal received by the antenna 110 through the low noise amplifier 122 and the coaxial cable 8. The input power Pin1 of the receiving signal inputted to the first receiving portion 221 at step S204, and the processing moves to step S206.

At step S206, the controller 230 accesses the memory 232. The controller 230 reads out the coupling amount C, the gain Gs1 of the power amplifier 141, and the gain Gr1 of the low noise amplifier 122, which are stored in the memory 232. The processing moves to step S208.

At step S208, the loss amount calculation processing is performed, and the processing moves to step S210. In the loss amount calculation processing at step S208, the loss amount L of the coaxial cable 9 is calculated. Followingly, a processing calculating the loss amount L will be described.

The input power Pin1 of the receiving signal received by the first receiving portion 221 is represented by the following expression 6:

$$Pin1 = Ps1 - C + Gr1 - L = Pout1 + Gs1 + Gr1 - C - 2L \quad \text{(expression 6)}.$$

The loss amount L is calculated by the following expression 7 by transforming the expression 6:

$$L = (Pout1 - Pin1 + Gs1 + Gr1 - C)/2 \quad \text{(expression 7)}.$$

The input power Pin1 of the receiving signal, the output power Pout1 of the sending signal, the gains Gs1, Gr1, and the coupling amount C are substituted to the expression 7, and it is possible to calculate the loss amount L.

At step S210, by referring to the loss amount L calculated at step S208, the gain Gs1 of the power amplifier 141 and the gain. Gr1 of the low noise amplifier 122 are adjusted. The processing moves to step S212. More specifically, it is supposed that the loss amount by each of the coaxial cables 8, 9 is set to L0 for convenience when the amplifier gain adjustment processing is started, and that the loss amount L calculated at step S208 corresponds to L1. A value of ΔL1 corresponds to a difference between L0 and L1, and the value of ΔL1 is calculated. A new gain Gs1 that is set up at step S210 is a value obtained by adding ΔL1 to the gain Gs1 before adjustment. In addition, a new gain Gr1 that is set up at step S210 is a value obtained by adding ΔL1 to the gain Gr1 before adjustment. Incidentally, the loss amount L0 when the amplifier gain adjustment processing is performed for the first time after starting up the wireless communication device 200A is a supposed value (including 0 dB) that is set up in advance for determining the default value of the gain of each amplifier. Incidentally, L1 corresponds to a first loss amount in the present disclosure.

At step S212, a switch changeover processing is performed, so that the antenna 110 is set to a sending antenna and the antenna 130 is set to a receiving antenna. The processing moves to step S214. More specifically, the changeover switches 123A, 123B are set up so that the antenna 110 is connected with the coaxial cable 8 through the power amplifier 121. In addition, the changeover switch 240 connects the second sending portion 224 with the coaxial cable 8. Therefore, the antenna 110 is connected with the second sending portion 224 through the power amplifier 121 and the coaxial cable 8.

The changeover switches 143A, 143B are set up so that the antenna 130 is connected with the coaxial cable 9 through the low noise amplifier 142. In addition, the changeover switch 250 connects the second receiving portion 223 with the coaxial cable 9. Therefore, the antenna 130 is connected with the second receiving portion 223 through the low noise amplifier 142 and the coaxial cable 9.

Incidentally, in this step, the gain Gr2 of the low noise amplifier 142 and the gain Gs2 of the power amplifier 121 are supposed values that is set up according to the loss amount L (corresponding to L0) before the amplifier gain adjustment processing is performed, instead of L1 calculated at step S208.

At step S214, the controller 230 causes the second sending portion 224 to output the sending signal to the coaxial cable 9 at the desired output power Pout2. The processing moves to step S216. The output power Pout2 is the same value of the output power Pout1. The sending signal outputted from the second sending portion 224 is radiated from the antenna 110 through the coaxial cable 8 and the power amplifier 121. The sending power Ps2 radiated from the antenna 110 is represented by the following expression:

$$Ps2=Pout2-L+Gs2.$$

At step S216, the second receiving portion 223 receives the signal outputted from the second sending portion 224. In more detail, the sending wave radiated from the antenna 110 at step S214 is received by the antenna 130. The second receiving portion 223 receives the receiving signal received by the antenna 130 through the low noise amplifier 142 and the coaxial cable 9. The input power Pin2 of the receiving signal inputted to second receiving portion 223 is measured, and the processing moves to step S218.

At step S218, the loss amount calculation processing is performed in the same way as step S208, and the processing moves to step S220. The input power Pin2 of the receiving signal inputted to second receiving portion 223 is expressed by the following expression 8:

$$Pin2=Ps2-C+Gr2-L=Pout2+Gs2+Gr2-C-2L \quad \text{(expression 8).}$$

By transforming the expression 8, the loss amount L is calculated as described by an expression 9:

$$L=(Pout2-Pin2+Gs2+Gr2-C)/2 \quad \text{(expression 9).}$$

The output power Pout2 of the second sending portion 224, the input power Pin1 of the second receiving portion 223, the gains Gs2, Gr2 of each of the amplifiers 121, 142, and the coupling amount C are substituted to the expression 9, and it is possible to calculate the loss amount L.

At step S220, by referring to the loss amount L calculated at step S218, the gain Gs2 of the power amplifier 121 and the gain Gr2 of the low noise amplifier 142 are adjusted, and the processing moves to step S222. That is, when it is supposed that the loss amount L calculated at step S218 is represented by L2 so as to distinguish the loss amount L0, ΔL2 corresponds to a difference between L0 and L2 and ΔL2 is calculated. The new gain Gs2 set up at step S220 is a value obtained by adding ΔL2 to the gain Gs2 before adjustment. The new gain Gr2 set up at step S220 is a value obtained by adding ΔL2 to the gain Gr2 before adjustment. L2 corresponds to a second loss amount in the present disclosure.

Effects of the second embodiment will be described below. According to the configuration of the second embodiment, the loss amount L (corresponding to L1) is calculated from the output power Pout1 of the first sending portion 222, the input power Pin1 of the first receiving portion 221, the coupling amount C measured in advance, the gains Gs1, Gr1 of each of the amplifiers 141, 122. The amplifier adjustment part F22 adjusts the gain Gs1 of the power amplifier 141 in consideration of the loss amount L, so that the sending power Ps1 of the antenna 130 becomes equal to the reference power Pref.

In addition, the loss amount L (corresponding to L2) is calculated from the output power Pout2 of the second sending portion 224, the input power Pin2 of the second receiving portion 223, the coupling amount C measured in advance, and the gains Gs2, Gr2 of each of the amplifiers 121, 142. The amplifier adjustment part F22 adjusts the gain Gs2 of the power amplifier 121 in consideration of the loss amount L, so that the sending power Ps2 of the antenna 110 becomes equal to the reference power Pref.

According to the vehicle communication apparatus 1A in the present embodiment, since the gains of the power amplifiers 121, 141 are adjusted in consideration of the loss amount L in the coaxial cables 8, 9, it is possible that the sending power transmitted from the antennas 110, 130 is set to the reference power Pref irrespective of a vehicle model on which the vehicle communication apparatus 1A is mounted.

In addition, the memory 232, the loss amount calculation portions F3, and the adjustment portion F2 are provided with the wireless communication device 200A instead of the antenna module 100A. The memory 232, the loss amount calculation portions F3, and the adjustment portion F2 are components to equalize the sending power Ps of the sending wave radiated from the antenna 130 to the reference power Pref. In addition, the power amplifiers 121, 141 are implemented by variable gain amplifiers instead of fixed gain amplifiers, and it is implemented that the sending power from an antenna is adjusted by adjusting the gains of the power amplifiers.

Therefore, it is possible that a circuit provided into the antenna module 100A is prevented from being complicated, and that a packaging area of the antenna module 100A is prevented from increasing. It is possible that the vehicle communication apparatus sets the sending power from the antenna 130 into the desired value irrespective of the vehicle model to which the vehicle communication apparatus 1 is mounted.

In addition, according to the configuration of the second embodiment, the gains Gr1, Gr2 of the low noise amplifiers 122, 142 are adjusted in consideration of the loss amount L by the coaxial cables 8, 9. Therefore, it is possible that a receiving signal received with the antennas 110, 130 when used as a receiving antenna is amplified to a suitable power level, and is inputted to each of the receiving portions 221, 223. Since the input signal inputted to each of the receiving portions 221, 223 becomes a suitable power level, it is possible that communication quality is improved.

After the loss amount L is calculated once, the output powers Pout1, Pout2 may be adjusted using the calculated known loss amount L. More specifically, the first variation amount calculation part F23 calculates a variation of the input power Pin1 inputted to the first receiving portion 221 from the time of calculating the loss amount L (that is, from the time when the loss amount L is calculated). The amplifier adjustment part F22 adjusts the gain Gs1 of the power amplifier 141 based on the variation. For example, when it is supposed that the variation is represented by ΔPin1, a half of ΔPin1 may be added to the present gain Gs1. When a magnitude of attenuation of a signal until the signal outputted from the first sending portion 222 and transmitted from the antenna 130, and a magnitude of attenuation of a signal until the signal received with the antenna 110 is inputted to the first receiving portion 221 are equal, it is possible to respond to a dynamic variation of power by adjusting in this way.

In addition, the second variation amount calculation part F24 calculates a variation of the input power Pint inputted to the second receiving portion 223 from the time of calculating the loss amount L (that is, from the time when the loss amount L is calculated). The amplifier adjustment part F22 adjusts the gain Gs2 of the power amplifier 121 based on the variation. Accordingly, when a magnitude of attenuation of a signal until the signal outputted from the second sending portion 224 and transmitted from the antenna 110, and a magnitude of attenuation of a signal until the signal received by the antenna 130 is inputted to the second receiving portion 223 are equal, it is possible to respond to a dynamic variation of power by adjusting in this way. Incidentally, the first variation amount calculation part F23 corresponds to a second antenna-connecting variation amount calculation part, and the second variation amount calculation part F24 corresponds to a first antenna-connecting variation amount calculation part.

(Second Modification)

In the second embodiment, the loss amount L of the coaxial cables 8, 9, is calculated as L1 by the processing at from step S202 to step S208, and the loss amount is calculated as L2 by the processing at step S212 to step S218. That is, in the present embodiment, the loss amount L of the coaxial cables 8, 9 is calculated twice (L1 and L2). A calculation means of the loss amount is not limited to the configuration. Even when one of the antennas 110, 130 is used as the sending antenna, and the other is used as the receiving antenna, it is supposed that the loss amount of the coaxial cables 8, 9 is not change. Therefore, the gain of all amplifiers may be adjusted using L1 calculated at step S208, for example. Accordingly, it is possible to omit the processing from step S212 to step S218. It is possible to end the amplifier gain control processing more quickly.

In the second embodiment, the gains Gs1, Gr1 are adjusted with the loss amount L1 calculated at step S208. The gains Gs2, Gr2 are adjusted with the loss amount L2 calculated at step S218. The gains Gs2, Gr1, Gs1, Gr2 may be adjusted using an average of the loss amounts L1, L2.

(Third Modification)

In the second embodiment, the variable gain amplifier is implemented by the power amplifiers 121, 141 provided with the antenna module 100A. The output power of the sending wave radiated from the antennas 110, 130 corresponds to the reference power Pref by adjusting each of the gains. However, a configuration is not limited to this configuration.

For example, each of the amplifiers 121, 141, 122, 142 in the second embodiment may be fixed gain amplifiers as similar to the first embodiment, and the CPU 231 may include the output power adjustment part F21. The output power adjustment part F21 adjusts the output power Pout1 from the first sending portion 222 and the output power Pout2 from the second sending portion 224, so that the output power of the sending wave radiated from the antennas 110, 130 may be the reference power Pref.

According to the configuration of the third modification, it is possible that the sending power of the antenna is set to the reference power Pref. Incidentally, in the third modification, an exchange of a control signal for adjusting the gains of each amplifier is unnecessary, and accordingly, it is possible to simplify a connection between the wireless communication device 200A and the antenna module 100A.

(Forth Modification)

Figure 11:
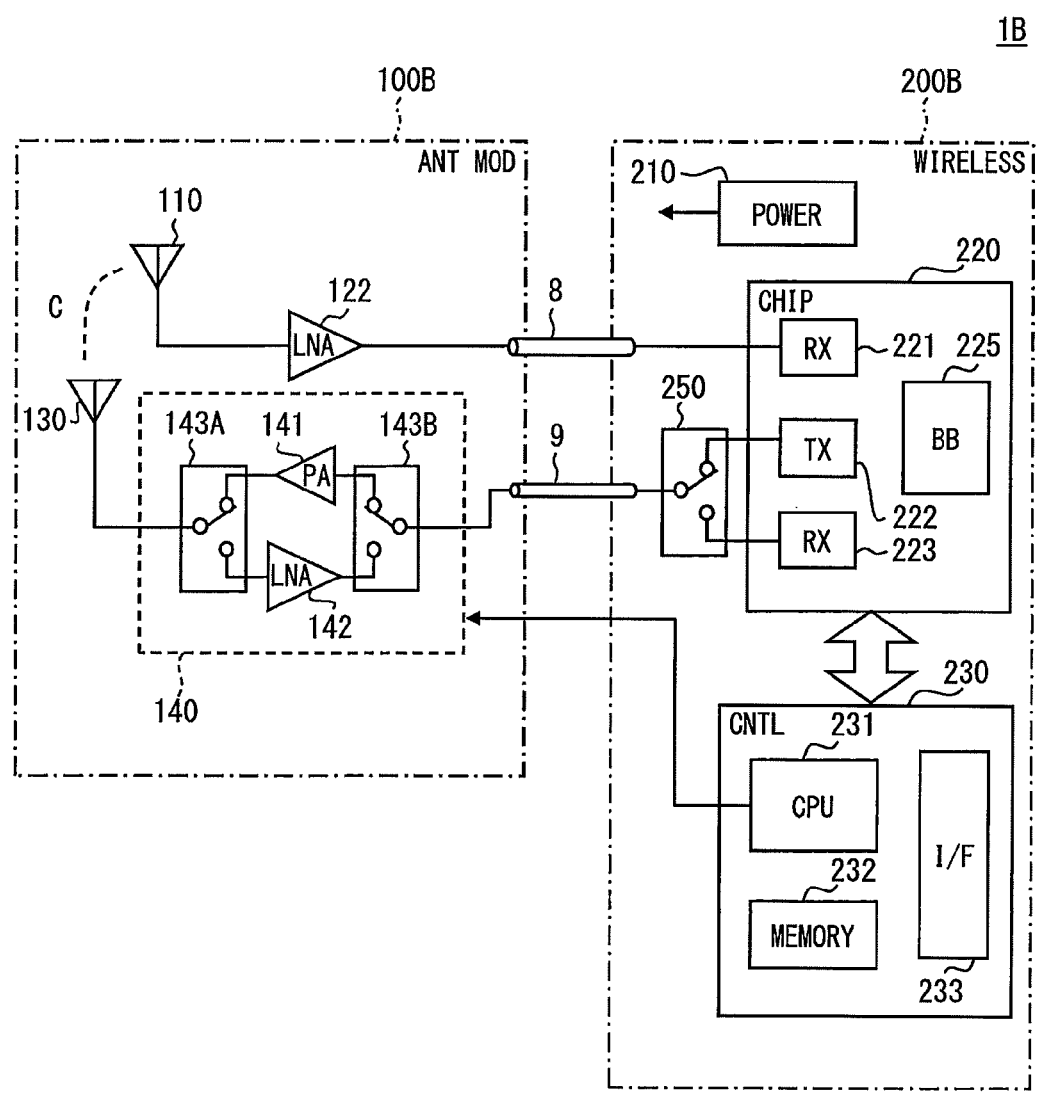
FIG. 11 is a block diagram illustrating an example of a schematic configuration of the vehicle communication apparatus in the fourth modification.

In the second embodiment, either one of the antennas 110, 130 may be a receiving antenna, and the other may be a sending antenna. However, the configuration is not limited to this configuration. As described in the vehicle communication apparatus 1B in FIG. 11, the antenna 110 may be used only for receiving, and the antenna 130 may be used for both functions of sending and receiving. That is, although it may be impossible to perform a transmission diversity, it is possible to perform a receive diversity. Incidentally, the antenna module 100B in FIG. 11 corresponds to the antenna modules 100, 100A, and the wireless communication device 200B corresponds to the wireless communication device 200, 200A.

In the fourth modification, at the time of the gain adjustment of the amplifier 141, connection states of the change-over switches 143A, 143B, 250 are set up, so that the antenna 130 is connected with the first sending portion 222 through the power amplifier 141 and the coaxial cable 9. A signal transmitted by the first sending portion 222 may be received by the first receiving portion 221, the loss amount L of the coaxial cable 9 may be calculated, and the gain Gs1 of the power amplifier 141 may be adjusted.

In the fourth modification, a fixed gain amplifier may be used in each amplifier, the output power Pout1 of the first sending portion 222 may be adjusted, and the sending power Ps1 of the antenna 130 may be the reference power Pref.

Third Embodiment

As described above, although the first embodiment and the second embodiment of the present disclosure are explained, the present disclosure is not limited to the first and second embodiment, and a third embodiment is also included within a scope of the present disclosure, for example. Followingly, the third embodiment will be explained with referring to the drawings.

A main difference between the third embodiment, and the first embodiment, the second embodiment and the various modifications is that a temperature characteristic of an amplifier included in the antenna module 100 is adjusted when the sending power from the antenna. In other words, except for taking the temperature characteristic of the amplifier into consideration, the third embodiment is similar to the first embodiment, the second embodiment, and various modifications. In addition, it is possible to combine the third embodiment with the above modifications. In order to simplify an explanation, the third embodiment will be described based on a configuration of the first embodiment described in FIG. 1.

Incidentally, for convenience of explanation, a member having the identical function with the member described in the drawings used in explanation of the first embodiment will be attached with the identical symbols, and the explanation will be omitted. When a part of a configuration in the third embodiment is explained, the explanation of the first embodiment is applied to other parts of the configuration.

The memory 232 provided with the vehicle communication apparatus 1 stores in advance a table (hereinafter, referred to as a temperature-gain table) that matches the temperature in the antenna module 100 to the gains Gr, Gs with respect to each of the amplifiers 122, 141. The temperature-gain table, for example, may be obtained by measuring the gains according to temperature in the antenna module 100 in advance. For example, the temperature-gain table may be provided for each predetermined temperature range, such as 10 degrees Celsius. Alternatively, when it is possible to describe a function of relationship between temperature and the gain, the temperature-gain table may include the function. Incidentally, the temperature in the antenna module 100 corresponds to a surrounding temperature.

In addition, the memory 232 stores a data (corresponding to a normal range data) of a normal value range as the input power Pin in a case where the receiving portion 221 receives the sending signal transmitted by the subject wireless communication device 200 as the receiving signal. The normal range data includes an upper limit Max and a lower limit Min of the normal value as the input power Pin in a case where the receiving portion 221 receives the sending signal transmitted from the subject wireless communication device 200 as the receiving signal. The upper limit Max and the lower limit Min may be values appropriately measured by tests or the like. Incidentally, in the present embodiment, the normal range data includes both of the upper limit Max and the lower limit Min. The normal range data may include only the lower limit Min. In addition, it may be enough that the lower limit Min is equal to or more than the threshold Pth1. The lower limit Min corresponds to an abnormality determination threshold in the present disclosure. In addition, the upper limit Max, for example, may be obtained by subtracting the coupling amount C from the reference power Pref, and adding a maximum of the gain Gr of the low noise amplifier 122.

A function of the CPU 231 will be explained with referring to FIG. 12.

Figure 12:
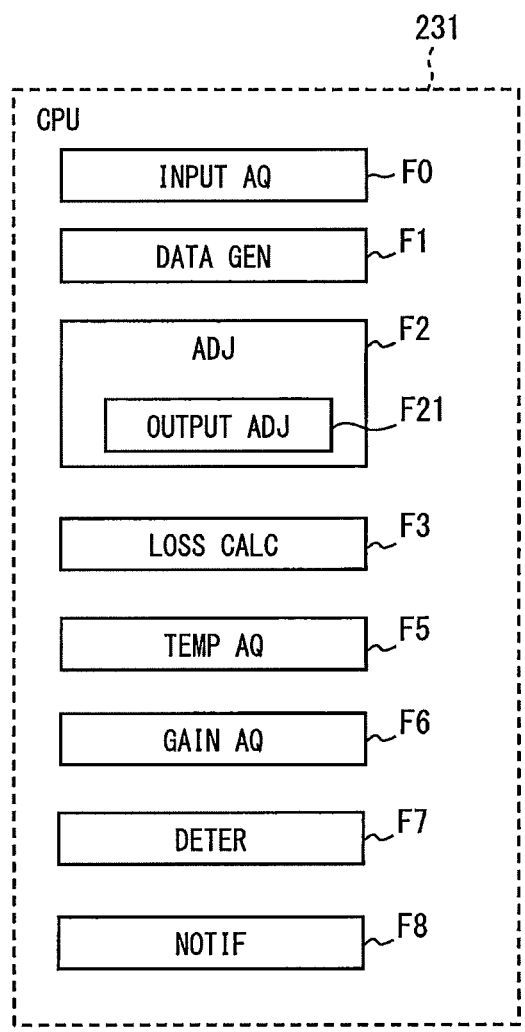
FIG. 12 is a block diagram illustrating a function of the CPU in a third embodiment.

As described in FIG. 12, the CPU 231 in the third embodiment includes an input power acquisition portion F0, a data generation portion F1, an output power adjustment part F21 as the adjustment portion F2, the loss amount calculation portion F3, the temperature acquisition portion F5, the gain acquisition portion F6, the abnormality determination portion F7, and the abnormality notification portion F8 as functional blocks.

The temperature acquisition portion F5 obtains the temperature in the antenna module 100. For example, the temperature acquisition portion F5 obtains the temperature detected by a temperature sensor such as a thermistor provided in a vehicle excluding the inside of the antenna module 100, and estimates the temperature in the antenna module 100 from a detection result of the temperature sensor. For example, when the temperature sensor detects the outside temperature of a vehicle, the memory 232 stores a data (referred to as an associated data) describing a correspondency of the outside temperature of the vehicle and the temperature in antenna module 100. Therefore, it is possible that the temperature acquisition portion F5 estimates (that is, acquires) the temperature in the antenna modules 100 from a corresponding data and the detection result of the temperature sensor. Alternatively, when the temperature sensor detecting the temperature inside the antenna module 100 is provided, the temperature in the antenna module 100 may be obtained from the temperature sensor.

The gain acquisition portion F6 obtains the gain Gr of the low noise amplifier 122 and the gain Gs of the power amplifier 141 from the temperature in the antenna module 100 obtained by the temperature acquisition portion F5 and the temperature-gain table stored in the memory 232. In the output power adjustment processing, the loss amount calculation portion F3 calculates the loss amount L by substituting the gains Gr, Gs obtained by the gain acquisition portion F6 into the expression 5. The output power adjustment part F21 determines the output power Pout using the gain Gs obtained by the gain acquisition portion F6 and the calculated loss amount L. The output power Pout is obtained by the following expression:

$$Pout = Pref - Gs + L.$$

Accordingly, the sending power Ps becomes a value in consideration of an effect of temperature with respect to a gain Gs of the power amplifier 141.

Incidentally, the temperature acquisition portion F5 updates the surrounding temperature successively. The gain acquisition portion F6 successively updates the gain Gr of the amplifier 122 and the gain Gs of the amplifier 141, which are corresponding to the surrounding temperature. The output power adjustment part F21 also performs the output power adjustment processing successively, and it is possible to adjust the sending power Ps in consideration of the effect of the temperature, which changes in time, to the power amplifier 141.

The abnormality determination portion F7 determines whether the input power Pin is in a normal power value by referring to the normal range data, when the sending signal transmitted from the wireless communication device 200 is inputted to the receiving portion 221 as the receiving signal. More specifically, when the input power Pin is equal to or more than the lower limit Min and is equal to or less than the upper limit Max, the abnormality determination portion F7 determines that the input power Pin is the normal power value. When a case other than the above case, that is, when the input power Pin is less than the lower limit Min or more than the upper limit Max, it is determined that the input power Pin is an abnormal power value. When it is determined that the input power Pin is the normal power value, it is determined that an abnormality does not occur in the vehicle communication apparatus 1. On the contrary, when it is determined that the input power Pin is the abnormal power value, it is determined that an abnormality occurs in the vehicle communication apparatus 1.

The abnormality notification portion F8 stops an output of the sending signal from the sending portion 222, and notifies a user that an abnormality occurs in the vehicle communication apparatus 1 when the abnormality determination portion F7 determines that the abnormality occurs in the vehicle communication apparatus 1.

According to the configuration, the loss amount calculation portion F3 uses the gains Gr, Gs obtained by the gain acquisition portion F6, and therefore, the loss amount L calculated by the loss amount calculation portion F3 becomes a value in consideration of the effect (that is, corresponding to a temperature characteristic) by the surrounding temperature of the power amplifier 141 and the low noise amplifier 122. Therefore, the output power adjustment part F21 adjusts the output power Pout from the sending portion 222 by considering the temperature characteristic of the amplifiers 141, 122. Therefore, the present embodiment has the same effects as the first embodiment, and furthermore, it is possible to adjust the sending power Ps of the antenna 130 to the reference power Pref more precisely.

When the abnormality determination portion F7 determines that the abnormality occurs in the vehicle communication apparatus 1, since the input power Pin is the abnormal power value, it may be impossible to automatically adjust the sending power Ps from the antenna 130 to a suitable value. Therefore, when the abnormality determination portion F7 determines that the abnormality occurs in the vehicle communication apparatus 1, the abnormality notification portion F8 notifies the user of the situation. Accordingly, it is possible that the user recognizes that a certain malfunction occurs in the vehicle communication apparatus 1 (e.g. the antenna module 1, the temperature sensor, or the like), and considers an action such as a repair or the like.

When it is determined that the vehicle communication apparatus 1 has an abnormality, the sending power Ps from the antenna 130 may not be adjusted to a suitable value. That is, there is a possibility that the sending power Ps may exceed the reference power Pref. Therefore, when the abnormality determination portion F7 determines that the vehicle communication apparatus 1 has an abnormality, it is possible to stop sending the signal and to prevent the signal of the sending power equal to or more than the reference power Pref from sending.

Incidentally, in the present embodiment, the temperature-gain table describes the gain Gr of the low noise amplifier 122 and the gain Gs of the power amplifier 141 for each temperature. However, the temperature-gain table is not limited to this configuration. For example, the temperature-gain table may describe a correction value corresponding to the default value of the gains of each of the amplifiers 122, 141 according to temperature. Incidentally, the default value of the gain of each of the amplifiers 122, 141 may set up appropriately.

(Fifth Modification)

In the third embodiment, the loss amount L in consideration of the temperature characteristic of each amplifier is calculated, the output power adjustment part F21 adjusts the output power Pout and the sending power of the antenna is set to the reference power Pref. However, the present disclosure is not limited to this configuration. When the power amplifier 141 is a variable gain amplifier, and the CPU 231 includes the amplifier adjustment part F22 as described in the second embodiment, the loss amount L may be calculated in consideration of the temperature characteristic of each amplifier and the amplifier adjustment part F22 may adjust the gain Gs of the power amplifier 141.

When multiple power amplifiers are included as described in the second embodiment, the amplifier adjustment part F22 may adjust the gain of other amplifiers (e.g. the power amplifier 121).

In addition, when the low noise amplifier 122 is a variable gain amplifier, the gain of the low noise amplifier 122 may be adjusted in consideration of the temperature characteristic. Accordingly, it is possible to improve reliability and quality of communication.

(Sixth Modification)

In the above embodiments and modifications, the sending power of the antennas 110, 130 is adjusted in either one of the amplifier adjustment part F22 or the output power adjustment part F21 so that the sending power becomes the reference power Pref. However, the present disclosure is not limited this configuration. For example, the CPU 231 may include both of the amplifier adjustment part F22 and the output power adjustment part F21, and may adjust the sending power from the antennas 110, 130 to the reference power Pref by combining an adjustment parameter of each portion.

In the above embodiments and the modifications, the antenna modules 100, 100A, 100B and the wireless communication devices 200, 200A, 200B are connected with the coaxial cables 8, 9. However, a communication cable such as a feeder wire may be used instead of the coaxial cables 8, 9. It is supposed that lengths of the coaxial cables 8, 9 are equal to each other in the above explanation. The lengths of the coaxial cables 8, 9 may be different. In this case, the loss amount by the coaxial cable 8 may be represented by La. The loss amount by the coaxial cable 9 may be represented by Lb. La and Lb are unknown quantities. An expression corresponding to the expression 2 may be formed, simultaneous equations may are obtained by changing Pout and the gains of each amplifier, and the simultaneous equations may be solved.

A vehicle communication apparatus includes an antenna module, 100A), a wireless communication device placed physically apart from the antenna module, a first communication cable connecting the antenna module with the wireless communication device and a second communication cable connecting the antenna module with the wireless communication device. The antenna module includes a first antenna and a second antenna. The wireless communication device includes a first antenna-connecting sending portion connected with the first antenna through the first communication cable and outputting a sending signal radiated from the first antenna as a sending wave, a second antenna-connecting receiving portion connected with the second antenna through the second communication cable and receiving the sending wave radiated from the first antenna with the second antenna as a receiving signal, an adjustment portion adjusting a sending power of the sending wave radiated from the first antenna, a memory storing in advance a coupling amount representing an attenuation degree of an electric wave between the first antenna and the second antenna, and a loss amount calculation portion calculating a loss amount by the first communication cable based on an output power when the first antenna-connecting sending portion outputs the sending signal to the first communication cable, an input power when the receiving signal is inputted to the second antenna-connecting receiving portion, and the coupling amount stored by the memory. The adjustment portion adjusts the sending power of the sending wave radiated from the first antenna based on the loss amount calculated by the loss amount calculation portion, and equalizes the sending power with a reference power.

According to the configuration, the loss amount calculation portion calculates the loss amount by the first communication cable based on the output power of the first antenna-connecting sending portion, the input power of the receiving signal inputted to the second antenna-connecting receiving portion, and the coupling amount stored in the memory. The adjustment portion adjusts and equalizes the sending power of the sending wave radiated from the first antenna with the reference power based on the loss amount due to the coaxial cable.

In addition, according to the configuration, the antenna module does not include a power detection device to detect the sending power of the first antenna. The wireless communication device instead of the antenna module includes the memory, the loss amount calculation portion, and the adjustment portion, which are components to equalize the sending power of the sending wave radiated from the first antenna with the reference power.

Therefore, according to the vehicle communication apparatus of the present disclosure, it is possible that a circuit of the vehicle communication apparatus is prevented from being complicated, and that a packaging area of the antenna module is prevented from increasing. It is possible that the vehicle communication apparatus sets the sending power from the first antenna into the desired reference power irrespective of the vehicle model to which the vehicle communication apparatus is mounted.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle communication apparatus comprising:
   an antenna module;
   a wireless communication device placed physically apart from the antenna module;

a first communication cable connecting the antenna module with the wireless communication device; and
a second communication cable connecting the antenna module with the wireless communication device, wherein
the antenna module includes a first antenna and a second antenna,
the wireless communication device includes
a first antenna-connecting sending portion connected with the first antenna through the first communication cable, and outputting a sending signal radiated from the first antenna as a sending wave,
a second antenna-connecting receiving portion connected with the second antenna through the second communication cable, and receiving the sending wave radiated from the first antenna with the second antenna as a receiving signal,
an adjustment portion adjusting a sending power of the sending wave radiated from the first antenna,
a memory storing in advance a coupling amount representing an attenuation level of an electric wave between the first antenna and the second antenna, and
a loss amount calculation portion calculating a loss amount by the first communication cable based on an output power when the first antenna-connecting sending portion outputs the sending signal to the first communication cable, an input power when the receiving signal is inputted to the second antenna-connecting receiving portion, and the coupling amount stored by the memory, and
the adjustment portion adjusts the sending power of the sending wave radiated from the first antenna based on the loss amount calculated by the loss amount calculation portion, and equalizes the sending power with a reference power.

2. The vehicle communication apparatus according to claim wherein
the adjustment portion includes an output power adjustment part adjusting the output power of the sending signal outputted by the first antenna-connecting sending portion, and
the output power adjustment part
adjusts the output power of the sending power of the sending wave radiated from the first antenna based on the loss amount calculated by the loss amount calculation portion, and
equalizes the sending power with the reference power.

3. The vehicle communication apparatus according to claim 1, wherein
the antenna module further includes a first antenna-side sending amplifier amplifying the sending signal,
the first antenna is connected with the first communication cable through the first antenna-side sending amplifier,
the memory stores a gain of the first antenna-side sending amplifier,
the adjustment portion includes a gain adjustment part adjusting the gain of the first antenna-side sending amplifier,
the gain of the first antenna-side sending amplifier is adjusted based on a control signal outputted from the gain adjustment part,
the gain adjustment part
adjusts the gain of the first antenna-side sending amplifier based on the loss amount calculated by the loss amount calculation portion, and equalizes the sending power of the sending wave radiated from the first antenna with the reference power.

4. The vehicle communication apparatus according to claim 1, wherein
the antenna module further includes a first antenna-side sending amplifier amplifying the sending signal, and a second antenna-side receiving amplifier amplifying the receiving signal,
the first antenna is connected with the first communication cable through the first antenna-side sending amplifier,
the second antenna is connected with the second communication cable through the second antenna-side receiving amplifier,
the memory stores a temperature-gain table in which a correspondency between a surrounding temperature, the gain of the first antenna-side sending amplifier, and the gain of the second antenna-side receiving amplifier is described,
the wireless communication device includes
a temperature acquisition portion obtaining the surrounding temperature, and
a gain acquisition portion obtaining the gain of the first antenna-side sending amplifier and the gain of the second antenna-side receiving amplifier based on the surrounding temperature obtained by the temperature acquisition portion and the temperature-gain table, and
the loss amount calculation portion calculates the loss amount by the first communication cable based on the output power, the input power, the coupling amount, the gain of the first antenna-side sending amplifier obtained by the gain acquisition portion, and the gain of the second antenna-side receiving amplifier obtained by the gain acquisition portion.

5. The vehicle communication apparatus according to claim 1, wherein
the memory stores an abnormality determination threshold to determine whether the input power is a normal power value as the receiving signal corresponding to a signal outputted from the first antenna-connecting sending portion, and
the wireless communication device includes an abnormality determination portion determining that an abnormality occurs in the vehicle communication apparatus when the input power is less than the abnormality determination threshold.

6. The vehicle communication apparatus according to claim 1, wherein
the first antenna is switchable between sending and receiving,
the second antenna is switchable between sending and receiving,
the wireless communication device includes
a first antenna-connecting receiving portion receiving the receiving signal received by the first antenna through the first communication cable, and
a second antenna-connecting sending portion outputting a sending signal to the second communication cable, the sending signal being radiated from the second antenna as the sending wave,
when the second antenna receives the sending signal transmitted from the first antenna,
the loss amount calculation portion calculates a first loss amount corresponding to the loss amount by the first communication cable based on the output power when the first antenna-connecting sending portion outputs the sending signal to the first communication cable, the input power when the sending signal is inputted to the second antenna-connecting receiving portion as the receiving signal, and the coupling amount stored in the memory, the adjustment portion includes a second antenna-connecting variation amount calculation part detecting a variation of the input power inputted to the second antenna-connecting receiving portion from a time of calculation of the first loss amount, and the adjustment portion adjusts the sending power of the sending wave radiated from the first antenna based on the first loss amount and the variation detected by the second antenna-connecting variation amount calculation part, and equalizes the sending power of the sending wave radiated from the first antenna with the reference power, and when the first antenna receives the sending signal transmitted from the second antenna, the loss amount calculation portion calculates a second loss amount corresponding to the loss amount by the second communication cable based on the output power when the second antenna-connecting sending portion outputs the sending signal to the second communication cable, the input power when the sending signal is inputted to the first antenna-connecting receiving portion as the receiving signal, and the coupling amount stored in the memory, the adjustment portion includes a first antenna-connecting variation amount calculation part detecting the variation of the input power inputted to the first antenna-connecting receiving portion from a time of calculation of the second loss amount, the adjustment portion adjusts the sending power of the sending wave radiated from the second antenna based on the second loss amount and the variation detected by the first antenna-connecting variation amount calculation part, and equalizes the sending power of the sending wave radiated from the second antenna with the reference power.

7. The vehicle communication apparatus according to claim 6, wherein the adjustment portion includes an output power adjustment part adjusting an output power of the sending signal outputted to the first communication cable by the first antenna-connecting sending portion, and an output power of the sending signal outputted to the second communication cable by the second antenna-connecting sending portion, and the output power adjustment part adjusts the output power of the first antenna-connecting sending portion based on the first loss amount and the variation detected by the second antenna-connecting variation amount calculation part, and equalizes the sending power of the sending wave radiated from the first antenna with the reference power, and the output power of the second antenna-connecting sending portion based on the second loss amount and the variation detected by the first antenna-connecting variation amount calculation part, and equalizes the sending power of the sending wave radiated from the second antenna with the reference power.

8. The vehicle communication apparatus according to claim 6, wherein the antenna module includes a first antenna-side bidirectional amplifier provided between the first antenna and the first communication cable, and amplifying the sending signal and the receiving signal, and a second antenna-side bidirectional amplifier provided between the second antenna and the second communication cable, and amplifying the sending signal and the receiving signal, the memory stores a gain of the first antenna-side bidirectional amplifier with respect to the sending signal, a gain of the first antenna-side bidirectional amplifier with respect to the receiving signal, a gain of the second antenna-side bidirectional amplifier with respect to the sending signal, and a gain of the second antenna-side bidirectional amplifier with respect to the receiving signal, the gain of the first antenna-side bidirectional amplifier and the gain of the second antenna-side bidirectional amplifier are adjustable, the adjustment portion includes a gain adjustment part adjusting the gain of the first antenna-side bidirectional amplifier with respect to the sending signal and the gain of the second antenna-side bidirectional amplifier with respect to the sending signal, the gain adjustment part adjusts the gain of the first antenna-side bidirectional amplifier with respect to the sending signal based on the first loss amount and the variation detected by the second antenna-connecting variation amount calculation part, and equalizes the sending power of the sending wave radiated from the first antenna with the reference power, and adjusts the gain of the second antenna-side bidirectional amplifier with respect to the sending signal based on the second loss amount and the variation detected by the first antenna-connecting variation amount calculation part, and equalizes the sending power of the sending wave radiated from the second antenna with the reference power.

9. The vehicle communication apparatus according to claim 1, wherein the reference power is a predetermined power.

* * * * *